United States Patent
Simpson et al.

(10) Patent No.: US 7,295,677 B2
(45) Date of Patent: Nov. 13, 2007

(54) SYSTEMS AND METHODS FOR ADDING WATERMARKS USING NETWORK-BASED IMAGING TECHNIQUES

(75) Inventors: Shell Sterling Simpson, Boise, ID (US); Ward Scott Foster, Boise, ID (US); Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 665 days.

(21) Appl. No.: 10/087,406

(22) Filed: Mar. 1, 2002

(65) Prior Publication Data
US 2003/0165253 A1    Sep. 4, 2003

(51) Int. Cl.
*G06K 9/00* (2006.01)
(52) U.S. Cl. ...................... 382/100; 713/176
(58) Field of Classification Search ............... 382/100; 713/176; 707/1; 711/163; 705/54, 57, 62
See application file for complete search history.

(56) References Cited

U.S. PATENT DOCUMENTS

| | | | |
|---|---|---|---|
| 6,222,932 B1 | 4/2001 | Rao et al. | |
| 6,253,323 B1 * | 6/2001 | Cox et al. | 713/176 |
| 6,396,594 B1 * | 5/2002 | French et al. | 358/1.18 |
| 6,526,155 B1 * | 2/2003 | Wang et al. | 382/100 |
| 6,546,114 B1 * | 4/2003 | Venkatesan et al. | 382/100 |
| 2001/0013097 A1 * | 8/2001 | Ito et al. | 713/176 |
| 2002/0018233 A1 | 2/2002 | Mori | |
| 2002/0032863 A1 * | 3/2002 | Ha | 713/176 |
| 2002/0037091 A1 * | 3/2002 | Terasaki | 382/100 |

FOREIGN PATENT DOCUMENTS

| | | |
|---|---|---|
| EP | 0859337 | 8/1998 |
| EP | 1137252 | 9/2001 |
| EP | 1215907 | 6/2002 |

* cited by examiner

*Primary Examiner*—Matthew C. Bella
*Assistant Examiner*—Shefali Patel (57) ABSTRACT

Systems and methods for adding a visible watermark to a document are disclosed. The systems may comprise a server and a computing device coupled to each other via a network. In some embodiments, a selected watermark image is associated with a target composition, forming a watermark composition. The watermark composition comprises the necessary information for a device to acquire and construct a desired integration of the watermark image with the target composition. Methods for adding a watermark image to a document, can be summarized by the following steps: selecting a watermark image; identifying a target composition; associating the watermark image with the target composition to generate a watermark composition; and storing the watermark composition.

16 Claims, 7 Drawing Sheets

SYSTEMS AND METHODS FOR ADDING WATERMARKS USING NETWORK-BASED IMAGING TECHNIQUES

TECHNICAL FIELD

The present disclosure relates to systems and methods for processing digital representations of image files. More particularly, the invention relates to systems and methods for adding a watermark to an image.

BACKGROUND OF THE INVENTION

Prior to the introduction of portable-printing machines, such as a typewriter, the term "watermark" was used to describe a mark or image in paper visible when the paper is held up to a light source. The "watermark" resulted from differences in thickness usually produced by pressure of a projecting design in a mold or on a processing roll in association with a printing press that imprinted an image on a paper medium. An observer of a document with a unique "watermark" could match the "watermark" with the mark associated with a particular publisher or printer to identify the source and/or authenticate the document.

While watermarks are still used today to both identify the source and to authenticate a document (e.g., a bank draft), the proliferation of relatively low-cost high-quality printing and color-copying devices coupled with advances in computer technology, including the networking of computing devices, have significantly undermined the ability of a visible watermark to identify a particular source and/or authenticate a particular document. Consequently, visible watermarks are no longer as heavily relied upon for identifying authors of documents and authenticating original documents because of the relative ease with which visible watermarks can be removed from a digital representation of an image. Once the visible watermark is effectively removed from the digital representation, unscrupulous parties can make copies of, and/or generate derivative works from, the underlying image, possibly violating the author's copyrights in the original document or image. Not only can an individual with a computing device and a printer violate an author's copyrights in a work, but the networking of computing devices permits an unscrupulous party to post the author's work on a publicly-accessible data-storage device for others to partake as well.

In response, a number of methods have been developed to protect copyrights of images, music, and the like, that can be stored on computing devices accessible via wide-area networks such as the Internet. One response is to encode the images or files. These cryptographic protection methods permit access to the encoded or encrypted data, to holders of a key. Once, a party acquires the key, the underlying image, audio, video, and multimedia data can be copied and distributed at will. Another response is to add a digital watermark into the various image, music, document, multimedia, or other files that are to be protected.

Unlike cryptographic methods that do not have a mechanism for tracking reproduction of a file, digital watermarks, in the form of an invisible-identification code that can be permanently embedded in the data, have the capability to identify each authorized purchaser of a protected file. Because the contents of the digital watermark are placed in perceptually significant components of the data, the removal of the watermark makes appreciation of the underlying data protected by the digital watermark virtually impossible. Modification of these components can lead to perceptual degradation of the underlying data. To avoid this, a digital watermark is inserted into the spectral components of the data using techniques analogous to spread spectrum communications. While not visible or audible to human senses, the digital watermark is discernible when operated upon by common data and geometric manipulations such as digital-to-analog and analog-to-digital conversion, resampling, and requantization, including printing and compression, rotation, translation, cropping and scaling.

Attempts to remove the digital watermark from an image will result in a noticeable degradation in image or signal quality well before the digital watermark is lost, thereby rendering the underlying data useless. Retrieval of the digital watermark unambiguously identifies the owner, and the digital watermark can be constructed to make counterfeiting almost impossible. Because the same digital watermarking algorithm can be applied to multiple file types (e.g., document, audio, photo, image, and video) with only minor modifications, the resulting digital watermark is appropriate for protecting various products that may be digitally stored and accessible via the Internet.

Because the digital watermark allows unique identification of copyright owners, buyers, and distributors, it provides a strong deterrent to illegal copying. Many believe that this digital-watermarking technique is an enabling technology that will help create a secure-business environment for copyright holders using the Internet.

It is still desirable however to mark documents and/or other image files with visible-graphic and/or text-based watermarks to identify the state or nature of the underlying document. For example, it is often desirable to mark a preliminary version of a document with a watermark containing the term "Draft" as a visible indication that the reader is observing a document in work. In addition, it is often desirable to mark documents with a classification level, such as, "Confidential" or "Proprietary." Document authors often add these and other classifications to their work product (e.g., documents, images, and the like) for use as a quick reference in identifying a limited group of intended recipients of the underlying message.

Some conventional-printer drivers support the addition of a watermark to data associated with a particular print task (i.e., a request to print a document file). A driver is a computer program that controls a device. Peripheral devices associated with computers, whether printers, disk drives, keyboards, pointing devices, and the like, are supported by a driver program. Many drivers, such as keyboard, disk drive, and pointing device drivers, are supplied with the operating system. For other devices, a driver program may have to be loaded before the associated peripheral device will operate with the computer.

A driver acts like a language translator between the peripheral device and programs that use the device. Each peripheral device has its own set of specialized commands that only its driver knows. In contrast, most application programs access devices using generic commands. The driver, therefore, accepts generic commands from an application program operating on the computer and translates the commands into the specialized commands for the particular peripheral device.

Often, a printer driver that supports watermarks for use with a particular printer model does not even exist. In cases where a printer driver has been created for use with a particular printer model, the driver is located and installed. Even when they exist, conventional-printer drivers that support the addition of a visible watermark in a hard-copy product have a number of limitations. First, the drivers are located and installed. Second, conventional printers and associated drivers do not include the capability to integrate a watermark across multiple printers. Because printer drivers as explained above are generated for each particular type of printer, a watermark that has been added or defined for use with a first printer is not automatically usable with another printer. Stated another way, an operator of a computing system that desires to integrate a particular watermark with multiple printers must recreate the watermark with each printer. Third, conventional printers and their drivers do not support a true "preview" of the expected results. Because typical printer-driver user interfaces do not include the capability to retrieve an actual data document while integrating a watermark, a "preview" step generally results in a rendition of the location, color, and brightness of the watermark on a blank page. Only after a user of the software selects the "print" option is the data file acquired by the driver and forwarded by the driver to the printing device. At the time the data file is acquired by the driver, printing has already been initiated.

Visible watermarks can also be integrated with the contents of a document or image file using various commercially-available word processing and desktop-publishing application programs. Some of these applications, such as PageMaker®, commercially marketed by the Aldus Corporation of Seattle, Wash., U.S.A. and FinePrint™ by Fine-Print Software, LLC (http://www.fineprint.com/) of San Francisco, Calif., U.S.A. provide an interface wherein a user of the application can generate and store a graphic image for use as a watermark.

A user of the FinePrint application is provided an interface with which the user interacts with the FinePrint application to define one or more watermarks. Each watermark contains a certain font type, font size, rotation, color, and text. The FinePrint application permits the user to select a previously defined watermark. Once a watermark has been defined by the user, the FinePrint™ "capture" function may be used to deliver the data intended for integration with the defined watermark to the FinePrint application. The FinePrint application then provides a pseudo preview of the data selected for the print job together with the selected watermark. However, the pseudo preview does not account for specific characteristics (e.g., paper type) of the destination printer. Thus, conventional-software applications require installation of the application software, installation of specialized drivers, and multiple user-intervention steps to integrate, preview, and generate a hard-copy product with the watermark.

Despite the capabilities now available via printer drivers and software applications to add visible watermarks to a hard-copy rendition of a data file, there still is a need for improved systems and methods for seamlessly integrating a watermark with an image file.

SUMMARY OF THE INVENTION

In response to these and other shortcomings of the prior art, systems and methods for adding watermarks using network-based imaging techniques have been invented and are disclosed.

In some embodiments, a network-coupled watermark service offers a plurality of suitable watermarks stored as image files to users of the system operating through various computing devices coupled to the network. An operator selects a desired watermark to display in register with one or more image files. Executable logic responsive to an operator request integrates the user's designated image files with the selected watermark image, thus generating a "composition" that includes image information reflective of both the watermark image and the one or more target images. The "composition" may then be stored for future reference and/or forwarded to other network-coupled services, such as a printing service, a publicly accessible storage service, etc. In some embodiments, the executable logic does not overwrite the original version of the target image file. Thus, these implementations retain a copy of the original target-image file along with the newly-generated composite image that contains both the target-image information and the watermark-image information. Other embodiments may contain logic configured to overwrite the target image file such that only a modified version of the original target-image file exists.

Other embodiments of the system can be viewed as providing methods for adding watermarks using network-based imaging solutions. In this regard, a method for adding a watermark can be summarized by the following steps: accessing imaging data reflective of a watermark; integrating the image data with a first composition that includes information reflective of a target image file designated for integration (i.e., displayed in register) with the watermark; and generating a second composition that includes image data reflective of the watermark and the first composition.

Other systems, methods, and features associated with adding watermarks will become apparent to one with skill in the art upon examination of the following drawings and detailed description. It is intended that all such additional systems, methods, and features included within this description, are within the scope of the systems and methods for adding watermarks as protected by the accompanying claims.

BRIEF DESCRIPTION OF THE DRAWINGS

The systems and methods for adding watermarks can be better understood with reference to the following drawings. The components in the drawings are not necessarily to scale. Emphasis instead is placed upon clearly illustrating the principles of adding watermarks to stored data compositions. Furthermore, in the drawings, like reference numerals designate corresponding parts throughout the several views.

DETAILED DESCRIPTION

As described above and as will be further detailed below, a visible watermark is a humanly observable image, which is integrated with a primary or target image. Often, a visible watermark consists of a logo, a seal, or other identifier commonly associated with the party or organization that holds the rights to the primary or target image. The visible watermark allows the primary image to be viewed, but still marks the primary image as the property of the owner (or marks the image in some other way, such as indicating that the primary image is a "draft" image). The visible watermark may be added on top of each page of a composition or behind each page (i.e., the target or primary image may be applied after the visible watermark has been applied to the page and/or the primary image may take precedence such that it appears to overlay the watermark when presented on a display device or in a final product) in the composition. The watermark may be restricted to certain pages, such as all pages but the first, all odd pages, only the first page, all even pages, or any other arrangement.

While the focus of the present application addresses the integration of a visible watermark using a network-based imaging technique, it is significant to note that the systems and methods described below do not preclude the concurrent integration and use of digital watermarks as described above.

Various aspects of the system and method for adding watermarks using network-based imaging solutions, having been summarized above, reference will now be made in detail to the description of the exemplar systems and methods for adding watermarks as illustrated in the drawings. While the systems and methods for adding watermarks will be described in connection with these drawings, there is no intent to limit it to the embodiment or embodiments disclosed therein. On the contrary, the intent is to cover all alternatives, modifications, and equivalents included within the scope of the systems and methods for adding watermarks using network-based imaging solutions as defined by the appended claims.

Generally, the system has a distributed architecture with which a user can maintain data in a personal-imaging repository. Various network-coupled services, including services that generate and store and/or simply store watermark images, among other services, may controllably provide data to, or alternatively accept data from, one more target images. Target images may be stored in a user's personal-imaging repository. Target images may be accessed by a composition. A destination service in the system accesses imaging information available through a user's personal-imaging repository. Conversely, a source service in the system contributes information to a user's personal-imaging repository. This imaging information can be accessed and/or provided in a variety of forms because the imaging information is accessed through a collection of methods (i.e., a programmatic interface) that enables a node in the system (i.e., a personal-imaging repository, a destination service, a source service, and/or a service that acts as both a destination and a source service, among others) to negotiate the preferred form(s) in which it wishes to transfer data. A system node can be a computing device or some other device, such as a router, a printer, a scanner, among others, communicatively coupled with the network. Each node has a unique network address sometimes called a data-link control (DLC) address or a media-access control (MAC) address.

In some arrangements, the user identifies and accesses a network-based or web-based imaging service that enables the user to access the imaging data in the user's personal-imaging repository (i.e., a target image file), as well as arrange the imaging data as desired. An imaging-source service does not necessarily have to access a personal-imaging repository before contributing imaging information (including the arrangement of imaging information, which, in a sense, is just another kind of imaging information) to the user's personal-imaging repository. An imaging-source service generates imaging data that is added to the users personal-imaging repository. This can be accomplished by the user inputting data, the user arranging existing data already in their personal-imaging repository, as well as by other methods. Thus "imaging data" is associated with the user in question, so that imaging-destination services can subsequently use user-specific data.

Once the arrangement has been completed (i.e., a target image or composition is identified), a document and/or other graphic images can be stored in the user's personal-imaging repository. Thereafter, as desired, a network-based imaging watermark server can be accessed to formulate and/or retrieve a desired watermark image for integration with one or more target images stored in the user's personal-imaging repository.

The watermark service may be realized on a local node (i.e., a local area network connected device) or a remote node (i.e., a wide area network connected device) in the system. In some embodiments, the watermark service may be integrated with a print service or other publishing service. As in the case of the watermark service, the print service may also be realized on local node or a remote node in the system. In other alternative embodiments, a watermark service may be embedded within a print device, an image-acquisition device, such as a digital camera, a digital-video camera, a scanner, among others, or may operate on a server separate and distinct from the print device. It should be appreciated that in the case where the print service is remotely located, the user may be interfacing with a third-party operated service that may provide network-based printing services in exchange for payment of a fee.

Figure 1:
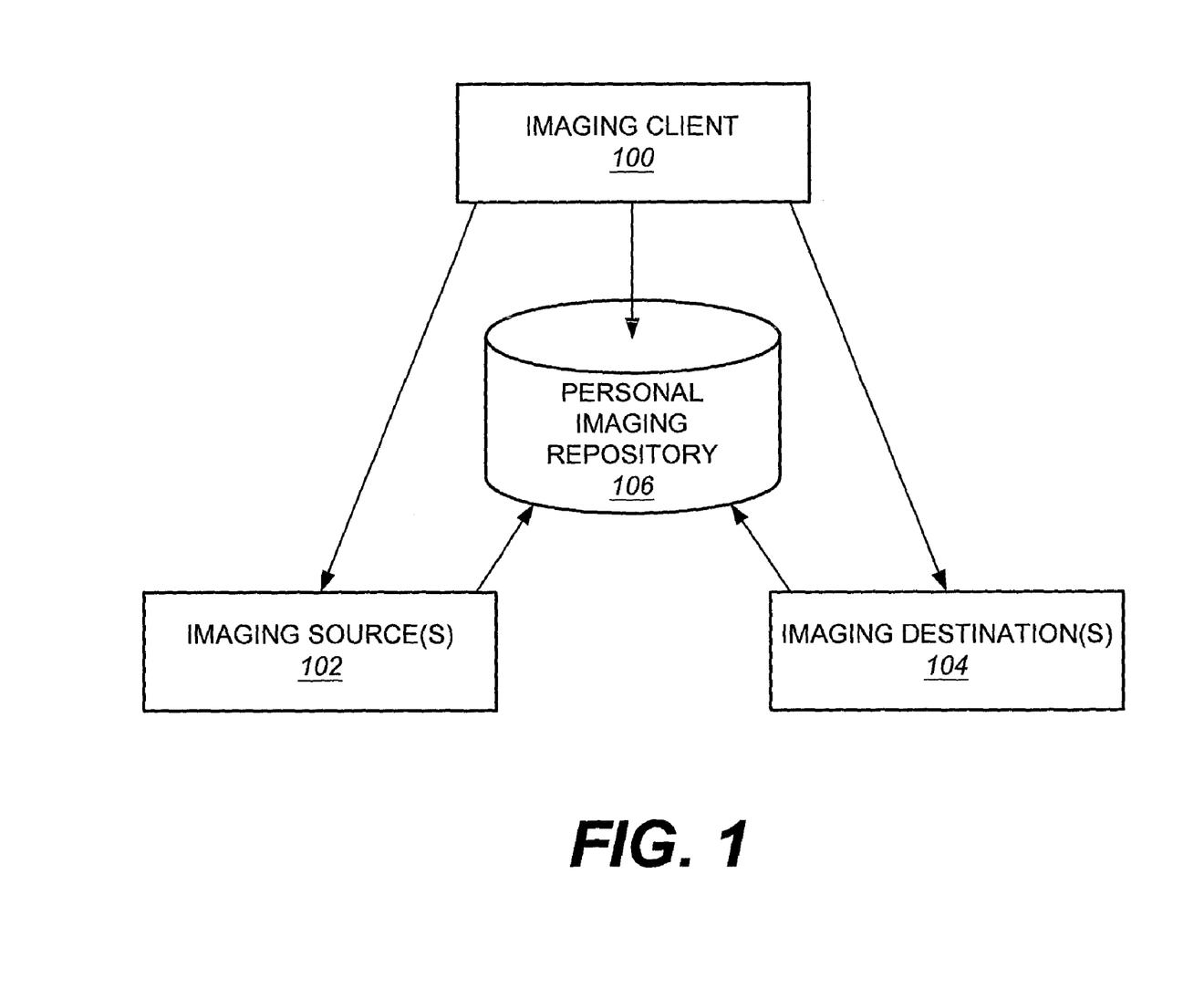
FIG. 1 is a schematic illustrating the general operation of an exemplar solution for adding watermarks to stored data compositions.

FIG. 1 is a schematic representation of the general operation of the systems and methods for adding watermarks. As shown in this figure, an imaging client 100 communicates with one or more imaging sources 102, one or more imaging destinations 104, and a personal-imaging repository 106. The imaging source(s) 102 represent any of a variety of devices/services that can be accessed by the imaging client 100 and used to select or identify imaging data that may be integrated as a watermark with a previously stored target image (e.g., a text document, a photo, a map, or other images).

The personal-imaging repository 106 provides image storage facilities that typically are personalized for the individual imaging client 100. The imaging repository 106 can be located in various places. For example, the repository 106 can be maintained on one or more computing devices associated with the imaging client 100, imaging source(s) 102, or imaging destination(s) 104. Alternatively, the repository 106 can be maintained on a separate computing device (e.g., a file server) that the imaging client 100, imaging source(s) 102, and imaging destination(s) 104 can access. The data in the imaging repository 106 can be any type of image or graphics-based data, such as text images, video frames, animations, photographs, and/or combinations thereof.

Once data is stored in the personal-imaging repository 106, the imaging client 100 can select data from the repository that is intended to be communicated to the imaging destination(s) 104 for some form of processing or manipulation. By way of example, the data may be transmitted to the image destination(s) 104 for printing. In these embodiments, the data may include a composition or a set of graphics identifying both a watermark and one or more target images. Where the imaging destination(s) 104 are adapted for printing, they may comprise any of a wide variety of printing devices that are capable of generating hard-copy products, such as printers, multi-function peripherals (MFPs), plotters, services-managing printing devices, and others.

As will be apparent from the discussions that follow, the above-described manner of operation provides a high degree of personalization to the imaging client 100. Specifically, in that the client's personal information can be accessed and utilized with any participating service (e.g., web site) accessible by the client, each accessible service can be "customized" based on the underlying data for each particular user.

Figure 2:
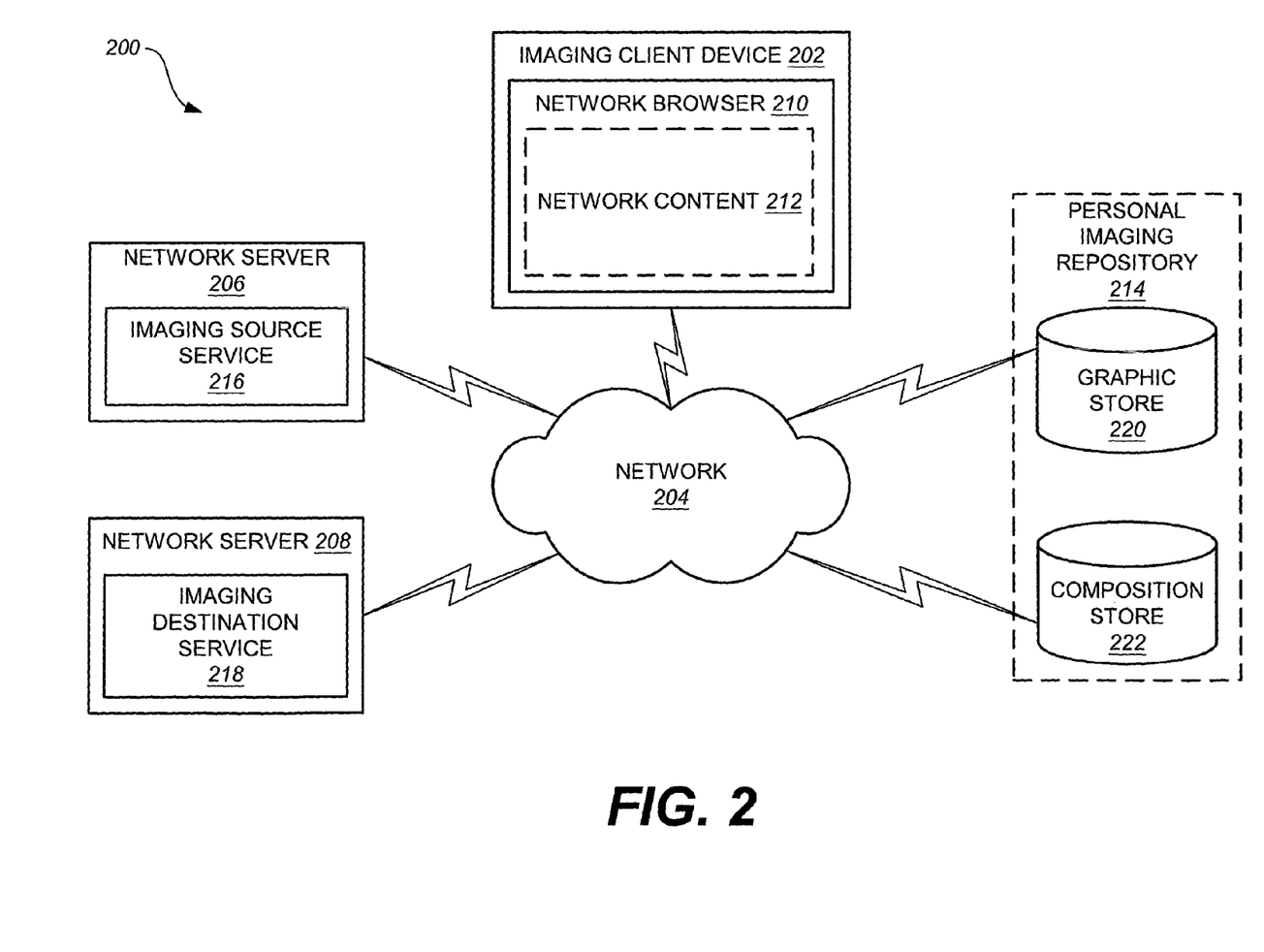
FIG. 2 is a schematic diagram illustrating an embodiment of a distributed system in which the system and method for adding watermarks to stored data compositions of FIG. 1 may be realized.

FIG. 2 illustrates an exemplar-distributed system 200 in which the systems and methods for adding watermarks can be implemented. As indicated in FIG. 2, the system 200 includes an imaging-client device 202 that is coupled to a network 204. Through this coupling, the imaging-client device 202, and therefore the imaging client (i.e., a user), can be placed in communication with one or more network servers, such as servers 206 and 208. The imaging-client device 202 and network servers 206 and 208 represent any of a wide variety of wired and/or wireless-computing devices, such as desktop computers, portable computers, dedicated-server computers, multiprocessor computing devices, personal-digital assistants (PDAs), mobile telephones, pen-based computers, gaming consoles, and so forth.

The network 204 represents one or more data-distribution networks that can be used to communicate data and other information (e.g., control information) between or among various computing devices. Examples for the network 204 include the publicly accessible wide-area network (WAN) commonly known as the Internet, a local-area network (LAN), other public and/or private WANs, and combinations thereof. The network 204 can further include various different types of networks, including wired and/or wireless portions, employing any of a variety of different communications protocols including public and/or proprietary communications protocols.

During operation, the user can operate a network browser 210 executing on the imaging-client device 202 to interact with imaging services 216, 218 executing on the network servers 206 and 208, respectively. As used herein, the term "services" refers to software and/or firmware components that can execute on one or more computing devices and which provide one or more particular functions to the imaging-client device 202, such as imaging-data selection and arrangement, data manipulation including integration of a watermark image, printing, and others. As indicated in FIG. 2, the network browser 210 can receive network content 212 from one or more of the network servers 206 and 208. This content 212 may include various components such as, for example, text, graphics, commands (e.g., hypertext mark-up language (HTML), Java™, JavaScript™, etc.) and/or applications (e.g., Java™ applets). In use, the content 212 in some arrangements may facilitate communication with a personal-imaging repository 214 so that the servers 206 and 208 can access data stored in the personal-imaging repository 214. Examples of the ways in which this communication can be facilitated are described below with reference to FIGS. 3 and 4.

The network server 206 executes an imaging-source service 216 that, among other things, allows the user to interact with his or her personal-imaging repository 214. The imaging-source service 216 may actually provide multiple services that can be accessed by the user. In some embodiments, these services can provide different functions to the user. For instance, one service may be responsible for graphic storage and retrieval while another service may be responsible for merging graphics in a single document. By accessing these services with the network browser 210, the user can select or identify imaging data that are to be stored as graphics in a graphic store 220 of the personal-imaging repository 214. These graphics can be stored as individual files and generally can comprise any data capable of representation as a two-dimensional graphic. As discussed below, the individual graphics in store 220 can be used as individual images that can be printed or otherwise reproduced on appropriate media, or multiple individual graphics can be compiled together as a single image for printing and/or other methods of generating a hard-copy output.

Irrespective of whether multiple graphics are to be used, the imaging-source service 216 can be used to arrange the graphic(s) on a visual representation of a document to be created. Once the arrangement has been selected, the imaging-source service 216 can store the arrangement as a composition (i.e., a composition image) in a composition store 222 of the personal-image repository 214. It is to be noted that, although the graphic store 220 and the composition store 222 are illustrated as two separate stores, multiple stores may exist in the system 200 and one or more graphic stores 220 may be combined with one or more composition stores 222 as desired. Additionally, one or more of these stores 220 and 222 may be implemented on the imaging-client device 202, one or more of the servers 206 or 208, or on other designated computing devices (not shown).

Once the graphics and composition have been selected, the image data can be processed or otherwise manipulated by accessing an imaging-destination service 218 that executes on the network server 208. Where one or more hard-copy products are to be generated, this service 218 can comprise a print service with which document(s) can be printed and/or other hard-copy products may be generated. In one such scenario, a print request is communicated to the imaging-destination service 218 and, upon receipt of the print request, the network server 208 interacts with the graphic store 220 and composition store 222 to retrieve the data needed to complete the print job. Once the data are retrieved, the network server 208 interacts with one or more printing devices (not shown) to which the server is coupled (directly or indirectly) to generate the hard-copy document(s).

Figure 3:
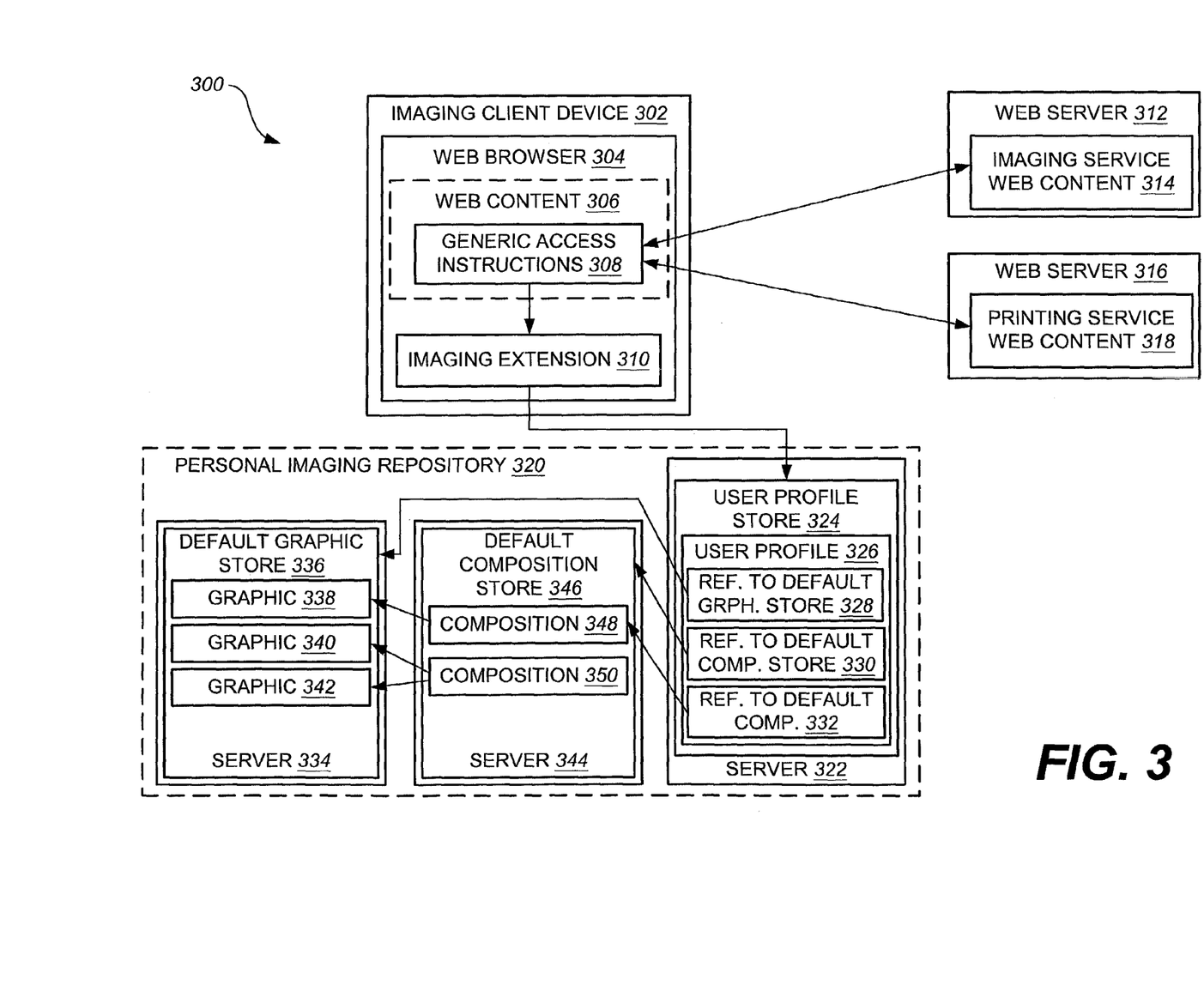
FIG. 3 is an embodiment of a network-based imaging system in which the system and method for adding watermarks to stored data compositions of FIG. 1 may be realized.

FIG. 3 illustrates a first exemplar network-based imaging system 300 in which the systems and methods for adding watermarks can be implemented. As will be appreciated from the discussion that follows, this system 300 can be described as a client-based implementation in that much of the system functionality is provided by a client device. A similar system is described in detail in U.S. patent application Ser. No. 09/924,058, entitled "A Method, System and Program Product for Multi-Profile Operations and Expansive Profile Operation," by Shell Simpson, Ward Foster, and Kris Livingston, the disclosure of which is hereby incorporated by reference in its entirety into the present disclosure.

As indicated in FIG. 3, the system 300 includes an imaging-client device 302. The imaging-client device 302 comprises a web browser 304 that is adapted to access web content 306 derived from imaging-service web content 314 and printing-service web content 318 of web servers 312 and 316, respectively. The web content 306, like content 212, typically comprises text, graphics, and various commands. The commands can comprise one or more sets of executable instructions that are downloaded (i.e., communicated) to the web browser 304 to perform a service requested by the user. These instructions can be written in any suitable language including, for instance, HTML, Java™, JavaScript™, C-sharp, or other appropriate languages. A variety of different functions can be served by the executable instructions. For example, the web content 306 normally includes executable instructions for causing graphics, i.e. graphics provided by an accessed web site, such as, but not limited to a watermark, to be displayed on an input/output device, such as a display monitor in association with the imaging-client device 302.

In the embodiment shown in FIG. 3, the executable instructions are further used to access a personal-imaging repository 320. These instructions typically comprise system-wide generic access instructions 308 that call on an imaging extension 310 to access the personal-imaging repository 320 and perform various web-imaging operations. These instructions 308 are designated as "generic" because they are independent of the configuration of the user's personal-imaging repository 320. As discussed in greater detail below, the generic access instructions 308 can be used to, for example, add a graphic, such as a watermark, to a default-graphic store 336 of the personal-imaging repository 320, or add a new composition to a default-composition store 346 of the personal-imaging repository 320.

As is further indicated in FIG. 3, the imaging extension 310 can form part of the web browser 304. Although this arrangement is shown in the figure and described herein, the imaging extension 310 can, alternatively, be provided outside of the web browser 304, for instance on a different device. Irrespective of its location, however, the imaging extension 310 is configured to respond to the execution of the generic access instructions 308 by generating and/or mapping corresponding imaging-client specific commands entered by the user. The imaging extension 310 typically is implemented as one or more application-programming instructions (APIs) that, preferably, act as interfaces in accordance with a system-wide standard.

When executed, the generic access instructions 308 cause imaging-extension calls (e.g., API calls) to be issued, which in turn, cause the imaging extension 310 (e.g., APIs) to access the user's personal-imaging repository 320. The web content 306 therefore uses the imaging extension 310 as a gateway to access the user's personal-imaging repository 320. Generally, the APIs can comprise sets of methods for establishing a destination for redirecting the web browser 304 based on some form of received redirection initiation. In such circumstances, the process normally comprises receiving a redirection initiation to redirect the web browser 304, retrieving a direct or indirect reference to a destination, and then causing the web browser 304 to extract information from that particular destination. It will be recognized that there are many other ways (both in hardware and software) to implement this function.

In some arrangements, the imaging extension 310 is configured to prevent the web content 306 (i.e., the executable instructions from one or more web services), from arbitrarily accessing the user's personal-imaging repository 320. This restricted access can be imposed upon the web content 306 using a variety of methods. For example, an imaging extension API can be configured to only accept references from the web content 306 that were previously provided by the imaging extension 310. In such a scenario, the content 306 cannot arbitrarily supply references when calling the imaging extension API. Therefore, in order to access the user's personal-imaging repository 320, the web content 306 must first obtain references using the imaging extension API.

The imaging extension 310 can be used to access one or more user profiles 326 that is/are stored in a user-profile store 324 of a server 322 of the personal-imaging repository 320. By way of example, the imaging extension 310 can be directed to the user profile 326 with a uniform-resource locator (URL), pointer, socket, or other detail. In some embodiments, the same user can have multiple user profiles. This may be particularly advantageous when a firewall (not shown) is encountered. When firewalls are encountered, different graphic stores and composition stores can be accessed depending on the location of the firewall in relation to the various stores and a communicating node.

The user profile 326 typically includes references to all or a portion of the personal-imaging repository 320 for that user profile. For instance, as shown in FIG. 3, the user profile 326 can include a reference 328 to a default-graphic store, a reference 330 to a default-composition store, and a reference 332 to a default composition. In use, the user-profile store 324 functions as a service that uses appropriate methods to create, modify, access, and cancel profiles. Accordingly, the imaging extension 310 maps to the appropriate methods (i.e., makes use of the methods) in the user profile 326 to obtain the reference to various repository items such as the default-graphic store 336 and the default-composition store 346.

Like the user-profile store 324, the default-graphic store 336 and default-composition store 346 can reside on separate servers 334 and 344. It will be understood, however, that one or more of the stores could reside on a single machine, if desired. As indicated in FIG. 3, the default-graphic store 336 is used to store various graphics, such as graphics 338, 340, and 342. These graphics can be stored in substantially any format. For example, these formats (i.e., file extensions) can comprise PDF, JPEG, PostScript, TIFF, GIF, BMP, etc. In addition, the default-graphic store 336 can include a programming interface consisting of a number of methods. Because the default-graphic store 336 is implemented as a network service, these methods would be accessible through some sort of remote invocation technology such as a remote procedure call (RPC), a simple object access protocol (SOAP), a common object request broker architecture (CORBA), a distributed component object model (DCOM), or others. Therefore, in contrast to merely providing for graphic storage, the graphic store 336 can also provide services used to create, retrieve, and/or manipulate graphics. These services may include a user interface for integrating various images as watermarks in target images stored within the graphics store 336. Furthermore, the default-graphic store 336 can communicate with the web content of various web services. For example, printing service web content 318 can submit queries to the default-graphic store 336 (via the extension 310) about a print job, as well as request that one or more graphics be transmitted in a desired arrangement to optimize printing performance. In some circumstances, the request may include a request for a watermark image as well as a target image.

The default-composition store 346 stores various compositions, such as compositions, 348 and 350, which can be used to arrange the selected graphics. Like the user-profile store 324 and default-graphic store 336, the default-composition store 346 can also comprise various programming interfaces consisting of a number of methods that can be used to access graphics from the graphic store, manipulate the graphics, etc.

There are a couple of key concepts that are important to understand. A composition and its reference are different. For example, an address, "19442 North Maidstone Way," and a house are two different things. The county tax assessor has the address of the house and some information regarding the lot, the structure, as well as other improvements, but the tax assessor does not actually have the house or the associated attributes. In this regard, sharing can be accomplished by reference. The county tax assessor does not need to move the house at 19442 North Maidstone Way in order to convey information about the house to a third party. The county tax assessor can instead pass the address and the associated attributes to the requesting third party.

In web-based imaging, things are even better. Instead of explicitly passing a reference around, it is possible to simply designate a reference as the "active" or "default" composition. That way, when a new service comes along it can make use of the "active" or "default" reference without having to ask the user which reference is desired. The user, of course, could be asked, but storing and communicating the default composition tends to make things easier for the user.

Figure 4:
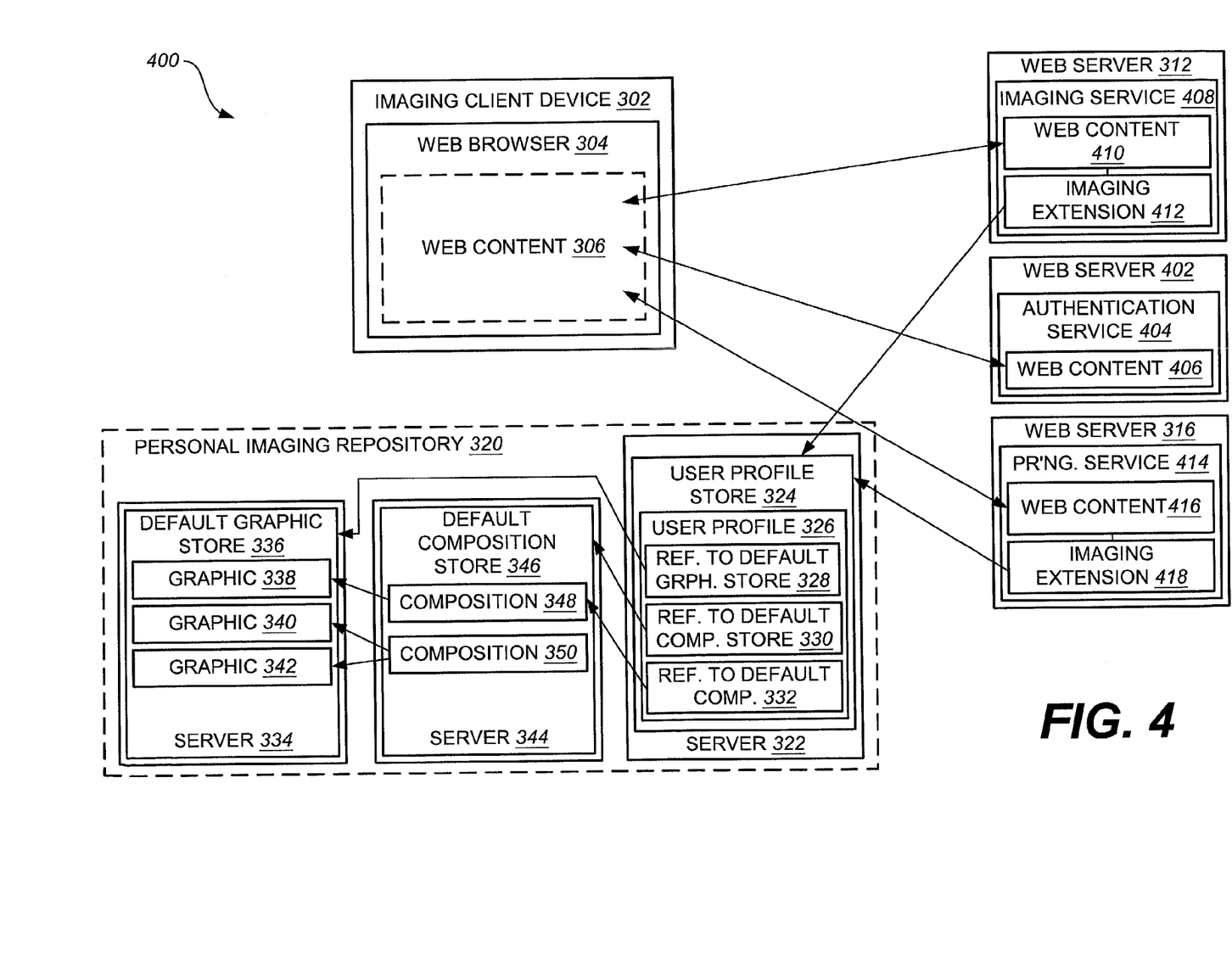
FIG. 4 is a second embodiment of a network-based imaging system in which the system and method for adding watermarks to stored data compositions of FIG. 1 may be implemented.

FIG. 4 illustrates a second exemplar network-based imaging system 400 in which the systems and methods for adding watermarks can be implemented. As indicated in FIG. 4, the system 400 includes many of the features of the system 300 shown in FIG. 3. Therefore, the system 400 includes an imaging-client device 302 that executes a web browser 304 to receive web content 306. The system 400 also includes a personal-imaging repository 320 that can, for instance, comprise a user-profile store 324, a default-graphic store 336, and a default-composition store 346. Furthermore, the system 400 includes web servers 312 and 316. Each of these components is generally configured in a similar manner as the like-named and numbered features identified in FIG. 3. However, unlike the client-based system 300, the system 400 provides a server-based implementation in which many of the functions provided by the client device 302 in the system 300 are transferred to another device. By way of example, this other device can comprise a further web server 402, which executes an authentication service 404. As shown in FIG. 4, the authentication service 404 comprises web content 406 that can be downloaded into the user's browser 304.

In addition to the above-noted differences, the servers 312 and 316 are provided with different software in the system 400 to permit alternative modes of operation. By way of example, the web server 312 can execute an imaging service 408, which includes web content 410 and an imaging extension 412. Similarly, the web server 316 can execute a printing service 414 that includes web content 416 and an imaging extension 418. Like the web content 314 and 318 of the system 300, the web content 410 and web content 416 typically comprise text and graphics that can be downloaded into the user's browser 304. Unlike the system 300, however, generic-access instructions need not be downloaded into the browser 304 in that the browser does not comprise its own imaging extension. Such an arrangement is advantageous where the imaging-client device 302 has limited storage capacity (e.g., for PDAs, mobile telephones and other similar devices). Instead, as identified above, the services 408 and 414 include their own imaging extensions 412 and 418, respectively, that can be used to access the user's personal-imaging repository 320. By way of example, the web content 410 and 416 comprise server-side code including one or more of personal-home page (PHP) or personal-home page hypertext-preprocessor scripts, Java™ Servlets, Java™ server pages (JSPs), active-server pages (ASPs), etc.

Each of the imaging extensions 412 and 418 typically has configurations that are similar to that of the imaging extension 310 (FIG. 3). Therefore, the imaging extensions 412 and 418 can comprise one or more programmatic interfaces that include one or more methods that, when invoked, access the user's personal-imaging repository 320. Again, the programmatic interfaces can comprise sets of methods for establishing a destination for redirecting the browser 304 based on some form of received redirection initiation. The programmatic interface can include methods that return or make use of, for instance, a URL, pointer, socket, or other detail to facilitate the redirection.

The manner in which the personal-imaging repository 320 is accessed by the services in the system 400 will now be discussed with reference to an exemplar scenario. In this example, the user browses to the imaging service 408 using the web browser 304 of the imaging-client device 302. Upon reaching the service 408, web content 410 is executed to generate web pages that are downloaded to the web browser 304 (as content 306).

For the purposes of this application, a web page refers both to data that is executed within the web server to generate data to be downloaded to the browser, as well as data that is downloaded to and executes within the browser. Presently, the art fails to distinguish between different stages of web-page generation. The terms "server-side" and "client-side," however, are often used to distinguish where web page related execution occurs. Once the content 306 is received, the browser 304 is redirected by the content 306 to the authentication service 404 that resides on the web server 402. Typically, this is accomplished by the web content 410 through the creation of a hypertext-transfer protocol (HTTP) redirect that when downloaded to the browser 304, causes the browser to redirect to an address (e.g., URL) identified in the header entry. Web content 410 is then downloaded to the web browser 304 and the user is provided with an opportunity to complete an authentication procedure that identifies both the user's identity and the location of the user's personal-imaging repository 320.

The authentication procedure can, for example, comprise entry of authentication information, such a user name and password that have been registered with the authentication service 404, for example, in a previous session. This information can be entered in a web page generated by the web server 402. In an alternative arrangement, the authentication procedure can comprise the reading of a user-identification card, which includes storage media (e.g., magnetic strip) that contains the user's authentication information. Persons having ordinary skill in the art will recognize that many other authentication alternatives exist that may be integrated with the systems and methods for adding watermarks.

Once the user successfully completes the authentication procedure, the browser 304 is again redirected, this time back to the imaging service 408. The redirection address (e.g., URL) directs the web browser 304 back to the imaging service 408 and may contain information that identifies the user and the user's personal-imaging repository 320 (e.g., with a further URL). To avoid continual redirection back and forth, a "cookie" can be stored on the imaging-client device 302 that permits the authentication service 404 to validate the user's identity without requiring a further log in. Note that the use of a "cookie" by the authentication service does not eliminate redirection between the imaging service and an authentication service. Such a "cookie" merely eliminates the need to query the user for identification information. A "cookie" could be used by the imaging service to avoid redirection to the authentication services. Once the user's identity information is possessed by the imaging service 408, the service can, when appropriate, make calls to its imaging extension 412 (e.g., programmatic interface calls) to command the imaging extension to access the user-profile store 324 of the personal-imaging repository 320. Through this access, the imaging service 408 can be used by the user to, for instance, select or identify imaging data to be stored as graphics in the default-graphic store 336.

When the printing service 414 is accessed, for example through redirection from the imaging service 408 as when a "print" button is selected, various content is downloaded to the web browser 304. The printing service 414 can then access the default-graphic store 336 and default-composition store 346 such that the graphics to be printed can be accessed and an intended arrangement of the document obtained. Although the default-graphic store 336 and default-composition store 346 may be accessed, typically a destination service such as printing service 414 accesses the default composition from the user profile. The default composition determines which graphics are accessed. The default composition may or may not refer to a composition that is located in the default-composition store 346.

Figure 5:
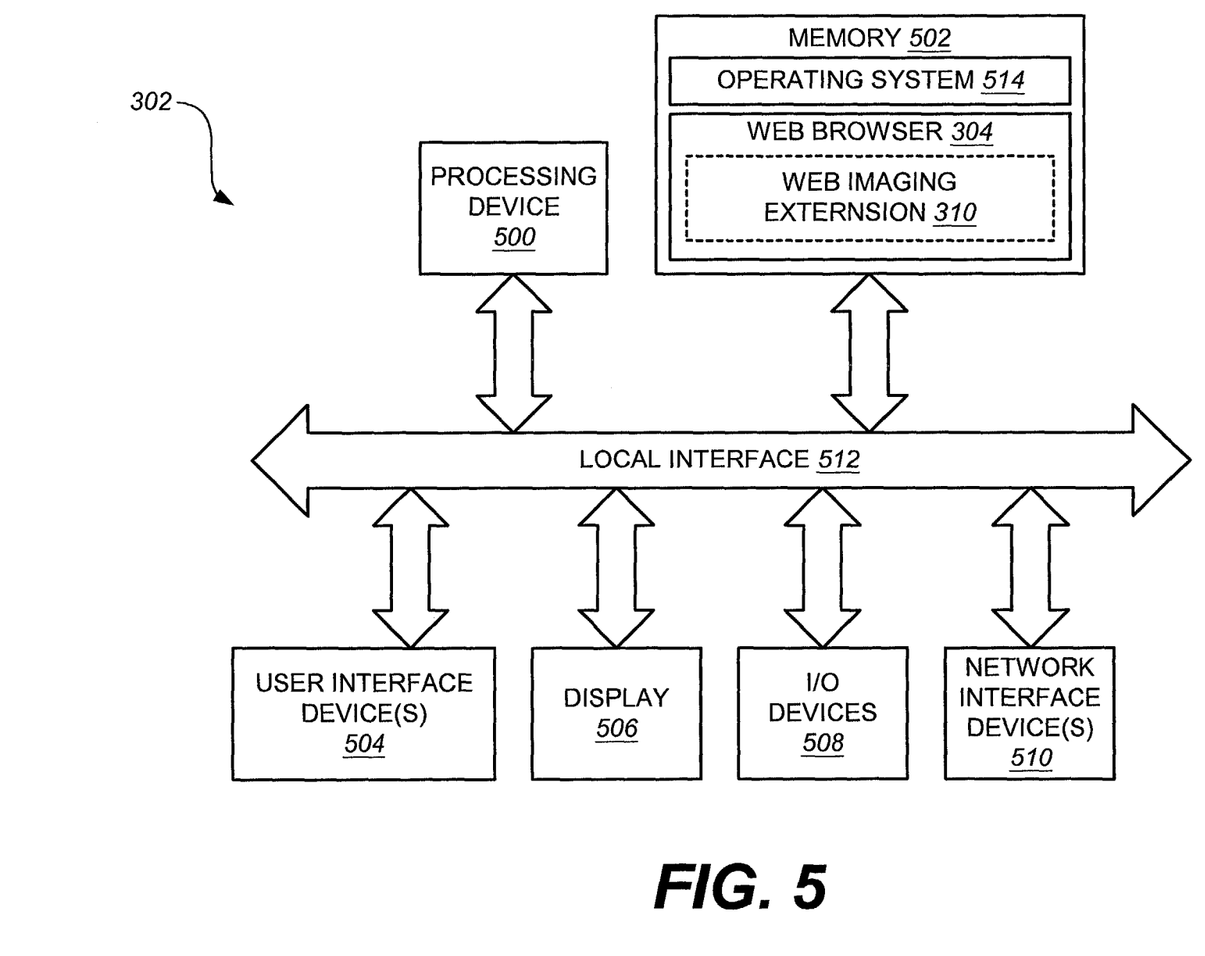
FIG. 5 is a schematic illustrating an embodiment of the imaging-client device shown in FIGS. 3 and 4.

Reference is now directed to FIG. 5, which presents a schematic view illustrating an exemplar architecture of the imaging-client device 302 introduced in FIGS. 3 and 4. As identified above, the client device 302 can be any one of a variety of computing devices, such as desktop computers, portable computers, dedicated-server computers, multi-processor computing devices, cellular telephones, PDAs, handheld or pen-based computers, gaming consoles, and others. Irrespective of its type, the client device 302 typically comprises a processing device 500, memory 502, one or more user interface devices 504, a display 506, one or more input/output (I/O) devices 508, and one or more network-interface devices 510, each of which is connected to a local interface 512.

The local interface 512 can be, but is not limited to, one or more buses or other wired or wireless connections as is known in the art. The local interface 512 may have additional elements, such as buffers (caches), drivers, and controllers (omitted here for simplicity), to enable communications. Further, the local interface 512 includes address, control, and data connections to enable appropriate communications among the aforementioned components.

The processing device 500 can include any custom made or commercially available processor, a central processing unit (CPU) or an auxiliary processor among several processors associated with the client device 302, a semiconductor-based microprocessor (in the form of a microchip), a macroprocessor, one or more application-specific integrated circuits (ASICs), a plurality of suitably configured digital-logic gates, and other well known electrical configurations comprising discrete elements both individually and in various combinations to coordinate the overall operation of the imaging-client device 302. The memory 502 can include any one of a combination of volatile-memory elements (e.g., random-access memory (RAM, such as DRAM, SRAM, etc.)) and nonvolatile-memory elements (e.g., ROM, hard drive, tape, CD-ROM, etc.).

The one or more user-interface devices 504 comprise those components with which the user can interact with the imaging-client device 302. For example, where the imaging-client device 302 comprises a personal computer (PC), these components can comprise a keyboard, a mouse, a joystick, etc. Where the imaging-client device 302 comprises a handheld device (e.g., PDA, mobile telephone), these components can comprise function keys or buttons, a touch-sensitive screen, a stylus, etc. The display 506 can comprise a computer monitor or plasma screen for a PC or a liquid-crystal display (LCD) for a handheld device.

With further reference to FIG. 5, the one or more I/O devices 508 are adapted to facilitate connection of the client device 302 to another device and may therefore include one or more serial, parallel, small computer-system interface (SCSI), universal-serial bus (USB), IEEE 1394 (e.g., Firewire™), and/or personal-area network (PAN) components. The network-interface devices 510 comprise the various components used to transmit and/or receive data over a network (e.g., network 204 in FIG. 2). By way of example, the network-interface devices 510 include a device that can communicate both inputs and outputs, for instance, a modulator/demodulator (e.g., modem), a wireless (e.g., radio frequency (RF)) transceiver, a telephonic interface, a bridge, a router, a network card, etc.

The memory 502 generally comprises an operating system 514 and a web browser 304. The operating system 514 controls the execution of other software and provides scheduling, input-output control, file and data management, memory management, and communication control and related services. As noted above with reference to FIGS. 3 and 4, the web browser 304 comprises software and/or firmware that is used to access various services over a network (e.g., Internet) and, therefore, download content from various different sources (e.g., imaging service web content 314, printing service web content 318, web content 406, 410, and 416, etc.). Where the web browser 304 is configured as indicated in FIG. 3, the web browser 304 can comprise an imaging extension 310. However, it will be understood that where the system is arranged as indicated in FIG. 4, the imaging extension 310 need not be provided in the web browser 304.

The architecture of the various servers shown in FIGS. 3 and 4 are typically similar to that described above with reference to FIG. 5. Therefore, separate figures are not provided for these servers. However, persons having ordinary skill in the art will recognize that various architectures could be used to realize the servers.

The various software and/or firmware described above can be stored on any computer-readable medium for use by or in connection with any computer-related system or method. In the context of this document, a computer-readable medium denotes an electronic, magnetic, optical, or other physical device or means that can contain or store a computer program for use by or in connection with a computer-related system or method. These programs can be embodied in any computer-readable medium for use by or in connection with an instruction-execution system, apparatus, or device, such as a computer-based system, processor-containing system, or other system that can fetch the instructions from the instruction-execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable-computer diskette, a random-access memory (RAM), a read-only memory (ROM), an erasable-programmable read-only memory (EPROM, EEPROM, or Flash memory), an optical fiber, and a portable compact-disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

Figure 6:
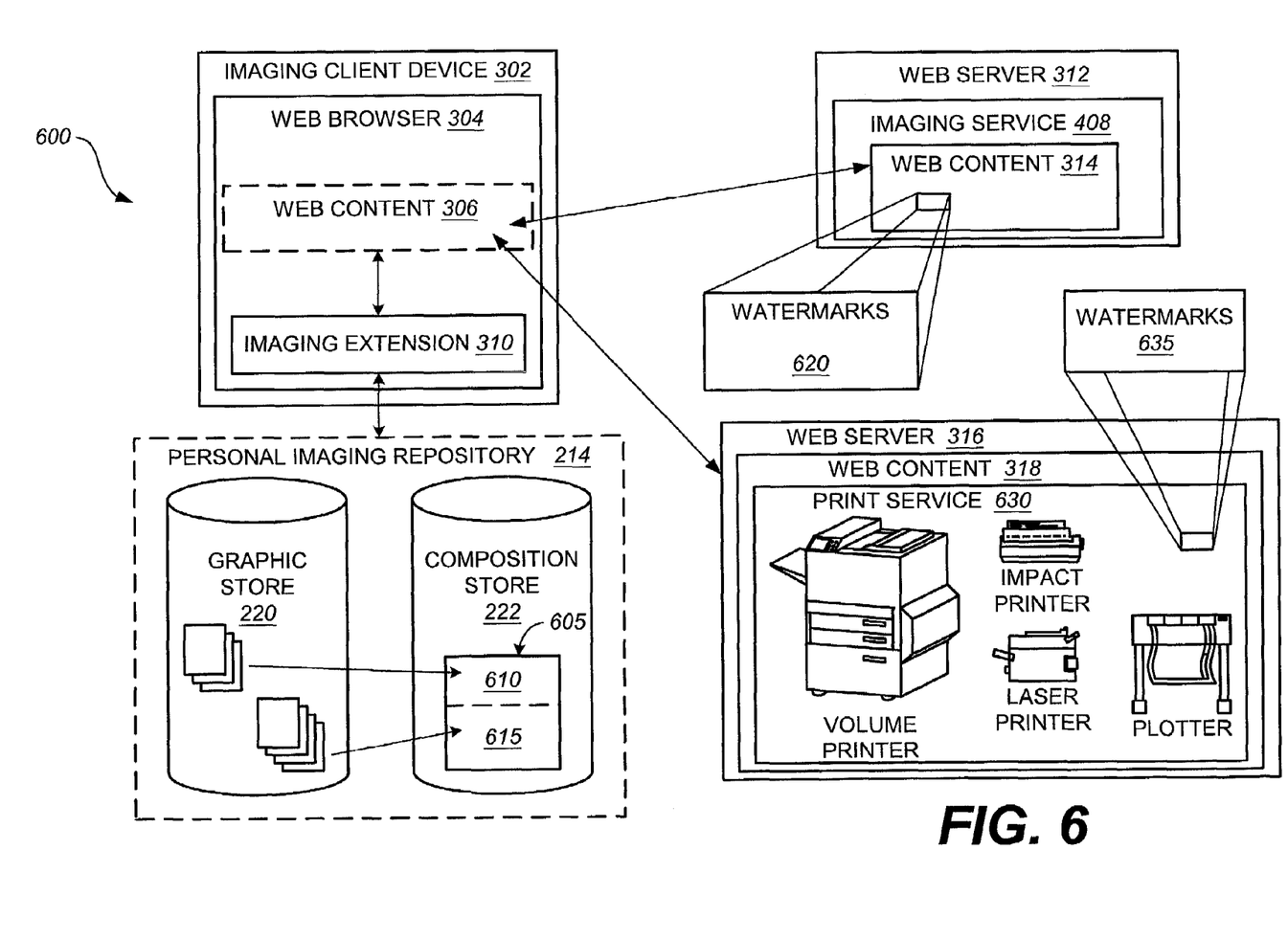
FIG. 6 is a schematic diagram illustrating an embodiment of an exemplar network-based imaging system.

FIG. 6 is a schematic diagram illustrating an exemplar network-based imaging system. As illustrated in FIG. 6, the system 600 includes an imaging-client device 302 that is communicatively coupled to a first web server 312 and a second web server 316 via a network (not shown for simplicity of illustration). Through this coupling, the imaging-client device 302, and therefore the imaging client (i.e., the user), can be placed in communication with various web content, such as the imaging service web content 314 and the web content 318. The imaging-client device 302 and the web servers 312 and 316 represent any of a variety of wired and/or wireless computing devices, as previously described.

During operation, the user can operate the web browser 304 executing on the imaging-client device 302 to interact with the imaging service web content 314 and the web content 318 executing on the web servers 312 and 316, respectively. In this example, web server 316 encompasses and provides accesses to a host of hard-copy generation services via print service 650. As illustrated in the schematic of FIG. 6, the remote service 650 may be configured to provide high-quality high-volume printing, plotting, impact printing, among other services including the integration of watermarks 635, as desired by users interacting with the system 600 via the imaging-client device 302.

As indicated in FIG. 6, the web browser 304 can receive imaging-service web content 314 in the form of watermarks (information) 620 from web server 312. The content 314 isn't actually received in the form of watermarks 620; rather, the content 314 includes some or all of the data and executables that may be used to integrate a watermark image into an existing composition 605. The watermarks 620 may include various graphic-based images suitable for integration as a watermark with a target image. Alternatively, it may contain references to these graphic-based images. A target image may include documents, photographs, and/or other data in the user's personal-imaging repository 214. A target image may even include several documents, photographs, etc. Essentially, the target image can be thought of as a composition 605. Sometimes a composition 605 will only reference a single graphic. Other times a composition 605 will reference several graphics. The composition 605 shown in FIG. 6 illustrates the integration of multiple graphic references 610, 615 into a single composition 605. Thus implying the integration of multiple graphics references with one or more watermark images. For example, one or more watermarks 620 may be integrated or associated with a particular composition 605 within the composition store 222 of the user's personal-imaging repository 214.

As shown in the schematic, the composition 605 may include a first graphic reference 610 and a second graphic reference 615. The graphic references 610, 615 refer to graphics stored in graphic store 220. Those skilled in the art will appreciate that various combinations of multiple graphics references including photographs, maps, etc. may be defined in the composition 605. Thus, the composition store 222 (a service) provides access to the first and second graphic references 610, 615 (data items stored referenced within the service). Just as a shoe store sells shoes, a composition store 222 provides access to graphic references 610, 615.

As previously noted, the composition 605 may be accessed through the use of web content 306 operating within the browser 304 as described in FIG. 3, or through the use of web content 406, 410, 416 operating within the web servers 402, 312, 316 as described in FIG. 4. In the context illustrated in FIG. 3, web content 306 refers to the data that is executed by web browser 304. In the context illustrated in FIG. 4, web content 406, 410, 416 refers to the data that is executed by web servers 402, 312, and 316 respectively. Typically web content 406, 410, 416 in this context is responsible for generating web content 306 sent to the web browser 304 for execution. Typically, the composition 605 will be analyzed on the imaging-client device 302 or on the servers 312, 316 depending on where the composition 605 is accessed.

In some embodiments, the print service 630 may be a local-publishing service or office associated with the user's place of business. In these embodiments, relatively noisy impact printers, high-volume printers, plotters, and the like may be segregated from reception areas, office areas, and other areas where it may be desirable to reduce the level of background noise. A user interface responsive to logic within imaging extension 310 may include the location of the resource and the next closest alternatives (e.g., the high-volume color printer in the $12^{th}$ floor print center, the color laser in the $12^{th}$ floor print center, etc.) along with an indication of whether the resources are on-line and/or whether the resources support the addition of a watermark on the associated print medium. Although depicted as a single service, it should be noted that several distinct services may exist including an imaging service (not shown) within print service 630 that may serve as a user-accessible storage facility for multiple watermarks 635 that can be associated with target images or target compositions 605 in the personal-imaging repository 214.

In this way, the system 600 provides a seamless solution for associating a watermark (i.e., a graphic image) that may or may not reside on an imaging-client device 302, with a target composition 605 which may contain one or more other graphic images. Once the target composition 605 is associated with the watermark, the web browser 304 may forward information and/or provide access to one or more remote services, such as print service 630 by way of a URL or other suitable method. Flexibility is provided because the user is able to choose among several available watermark services as well as multiple destination resources.

Instead of installing specific word processing, desktop publishing, and/or printer software (i.e., drivers) on the imaging-client device 302, a user of the system 600 can simply use the web browser 304 to locate a network or web-based imaging service 408. Imaging service 408 may be an imaging-destination service that has the capability of adding a watermark (i.e., another image) to a user identified active or default composition 605 stored in the user's personal-imaging repository 214. After locating the imaging service 408, the user may choose a particular watermark to incorporate into the user's default composition or selected composition. Once a watermark composition is generated containing the target composition and the watermark image, a user of the system can direct a print job using the watermark composition to any number of different printers.

In this regard, network or web-based imaging includes provisions for forwarding a print job. For example, a first web-based imaging-destination service may be in the process of printing documents and as it is printing a particular document some kind of failure occurs, interrupting the print job. With web-based imaging, an on-line user may be presented with the opportunity to choose a link that forwards the interrupted print job to another web-based imaging-destination service. Because both of these print services are accessing the underlying documents from the user's personal-imaging repository 214, the data being printed, and more specifically, the configuration of the data being printed does not change. Because the watermark is integrated into an image composition rather than being treated as a print setting, the user does not have to manually integrate a watermark, install drivers, etc. in order to transfer the print job to another printer. Stated another way, a redirected print job will use the same composition which still includes the watermark. Consequently, a "watermarked" document is free to flow to a variety of web-based imaging-destination services.

One way that the "watermarked" document may flow to a web-based imaging destination is as follows: web content may be served (upon request by a web browser) to a web browser. When no longer in use, the content may be effectively discarded from the memory of the browser. The web content itself is not forwarded. However, the browser may be redirected to another web page by the web content. This practice of redirecting a user to another web page is commonly referred to as forwarding. This technique is very useful in web-based imaging systems, since it is possible to switch the user's browser from one website to another website. This practice can be used to add a watermark to a composition at one website and print the composition at a separate and distinct website.

Exemplar systems having been described above, sample methods for adding watermarks to one or more target images will now be discussed. In this regard, the following discussions describe steps illustrated in the flowchart of FIG. 7. It should be understood that any process steps or blocks in these flowcharts may represent modules, segments, or portions of code that include one or more executable instructions for implementing specific logical functions or steps in the associated process. It should be appreciated that although particular process steps are described, alternative implementations are feasible. Moreover, some method steps may be executed out of order from that shown or discussed, including substantially concurrently or in reverse order, depending on the functions involved.

Figure 7:
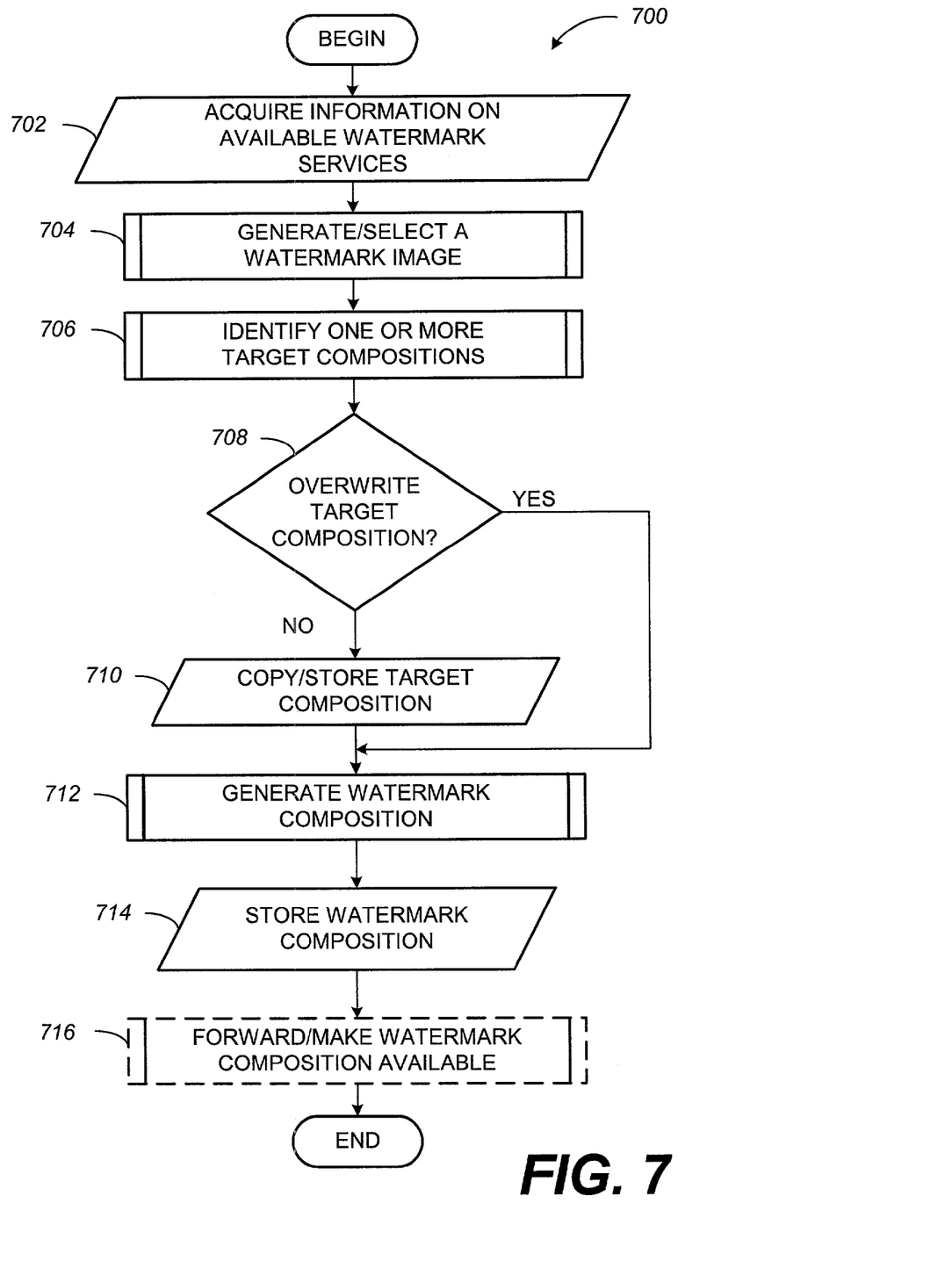
FIG. 7 is a flowchart illustrating a method for adding watermarks to stored data compositions that may be used in the network-based imaging system of FIG. 6.

Reference is now directed to FIG. 7, which presents a flowchart illustrating a method for adding watermarks 700 that may be used in the network-based imaging system of FIG. 6. In this regard, a system administrator practicing the method 700 may begin by acquiring information concerning one or more available services (e.g., the remote-imaging service 408 (FIG. 6)) that may be designed for generating, storing, and/or otherwise providing watermarks 620 (FIG. 6) to a user of the system 600 (FIG. 6) as illustrated in step 702. This may be accomplished manually or automatically.

The information acquired may include data concerning multiple resources, capabilities, processing rates, other fees, and the like. The information acquired may further include links to print services and other related services. Moreover, the information acquired may include web content 314 (FIG. 6) that may include logic configured to enable the integration of an underlying image with one or more target images in a composition store 222 (FIG. 6).

As illustrated in step 704, a user of the system 600 may generate and/or select a watermark image. After having identified a designated watermark image, as illustrated in exemplar methods illustrated in step 704, a user of the system 600 (FIG. 6) may identify one or more target compositions 605 (FIG. 6) designated to receive the watermark. This may be accomplished via a user interface provided by the imaging extension 310 under the direction of web content 314 received from the imaging service 408 (FIG. 6), as shown in step 706.

Next, logic within the system 600 may be configured to query a user of the system 600 to determine if the user desires to retain the original target composition. When it is the case that an operator of the system 600 desires to retain both the target composition (i.e., without the watermark image) an appropriate user stimulus will result in the application of step 710, where as illustrated a copy of the target composition will be generated and stored. Otherwise, when it is the case that an operator of the system 600 desires to overwrite the target composition with a watermark composition comprising both a designated watermark image and a target composition as illustrated by the flow-control arrow labeled, "YES" exiting the query of step 708, the system 600 may respond by simply generating the watermark composition as indicated in step 712 and thus bypassing step 710. Depending on the specific implementation either the original or the copy of the target composition can be modified to become the watermark composition.

Once the system 600 has generated the watermark composition as indicated in step 712, the system 600 maybe configured to store the watermark composition in the user's personal-imaging repository 214 or in other data-storage devices. As further illustrated in step 716, once the watermark composition has been generated and stored as described above, the system 600 may forward and/or otherwise make the watermark composition available to those with the proper access authority to the watermark composition.

It should be appreciated that method steps 702 through 716 may be repeated as desired to generate and integrate a watermark with one or more target compositions. Alternatively, method steps 702 through 716 may be repeated as desired to identify previously generated watermark images designated for application (i.e., integration) with one or more target compositions. Consequently, there is no limit to the number of watermark compositions that may be produced, stored, and applied by the system 600. While the method for adding a watermark 600 illustrated in FIG. 7 addresses the situation where a single watermark image is integrated with a single target composition, it should be understood that multiple watermark images may be integrated with a one or more target images as may be desired.

In some embodiments, the watermark image may be added to a "preferred" or "default" configuration that may include information designated to be forwarded with each print request forwarded from any node in the system 600 regarding "stores" associated with a particular user of the system. For example, a "default" configuration may include a direction to include a watermark image that includes text identifying the associated message as belonging to a particular business enterprise and/or the client addressee. Because the "default" configuration is a conglomeration of multiple images that include the watermark image, the user can initiate a print request from any node in communication with the personal-imaging repository 214 regardless of whether the communicating device understands watermarks, printer drivers, and/or other applications. Moreover, the user can identify a destination service for processing the final composition without having to confirm that the destination device is configured with appropriate software and/or firmware to complete the request.

It should be emphasized that the above-described embodiments are merely possible examples of implementations, merely set forth for a clear understanding of the principles of the systems and methods for adding watermarks. Many variations and modifications may be made to the above-described embodiment(s) of the systems and methods for adding watermarks without departing substantially from the principles thereof.

For example, a user of the system may choose an existing watermark, create a watermark using a locally operable and/or a network accessible application for that purpose. Regardless of the location of the watermark generation application, the user may select options such as text, font style, font size, font color, font rotation, or create a watermark from an image.

By way of further example, a watermark service, the service that adds the watermark to the user's personal-imaging repository may be a destination service because it accesses imaging information or document information from the user's personal-imaging repository. The same watermark service may also act as a source service in the sense that it adds imaging information to the user's personal-imaging repository. Stated another way, the watermark service may be responsible for updating the user's target composition with the watermark. These and all other such modifications and variations are intended to be included herein within the scope of this disclosure and the systems and methods for adding watermarks using network-based imaging techniques as protected and set forth by the following claims.

The invention claimed is:

1. A method adding a watermark image to a composition, said method comprising:
   a watermark service sending a first network communication to a client device, the first network communication including imaging service content representing a plurality of selectable watermark images;
   the watermark service receiving a second network communication from the client device, the second network communication including information related to a watermark image selected from the plurality of selectable watermark images, the watermark service operating on a first network server and having access to the plurality of watermark images;
   the watermark service accessing a target composition that includes one or more graphic references, the target composition identifying an arrangement of the one or more graphics referenced by the one or more graphic references in a document to be created, the target composition being stored on a second network server such that the watermark service accesses the second network server on which the target composition is stored to access the target composition; and
   generating a watermark composition comprising the one or more graphic references of the target composition and a reference to the selected watermark image.

2. The method of claim 1, wherein receiving a network communication selecting a watermark image is accomplished with the aid of an imaging extension.

3. The method of claim 1, further comprising storing the watermark composition within a composition store operating on the second network server.

4. The method of claim 3, wherein storing the watermark composition comprises retaining web content such that when the web content is served to a remote service web browser, the remote service generates a hard-copy product using the watermark composition.

5. The method of claim 1, wherein the target composition is stored in a personal-imaging repository associated with the user.

6. A system for adding a watermark to a composition, comprising:
   a watermark service coupled to a network and having access to imaging service content representing a plurality of selectable watermark images; and
   a computing device coupled to the network, the computing device configured with a browser, wherein the browser is configured to receive the imaging-service content from the watermark service, the imaging-service content including a reference for each of the plurality of selectable watermark images, enable a user of the browser to select a watermark image from the plurality of selectable watermark images represented by the imaging-service content, obtain the reference to the selected watermark image for integration with a target composition stored in a data storage device communicatively coupled with the computing device, the target composition including one or more graphic references and identifying an arrangement of one or more graphics referenced by the one or more graphic references in a document to be created, and at least initiate the generation of a watermark composition comprising the reference to the selected watermark image and the one or more graphic references.

7. The system of claim 6, wherein the reference to the selected watermark includes a reference to a textual watermark.

8. The system of claim 6, wherein the reference to the selected watermark includes a reference to a graphical design watermark.

9. The system of claim 6, wherein the browser comprises an imaging extension.

10. The system of claim 6, further comprising:
    a service server coupled to the network and a service, wherein the service server receives data from the browser.

11. The system of claim 10, wherein the data comprises resource device commands.

12. The system of claim 11, wherein the resource device commands are configured to direct the creation of a hard-copy product.

13. The system of claim 10, wherein the data comprises reference for accessing the watermark composition from the data storage device.

14. A computer-readable medium storing computer executable instructions for:
    receiving imaging-service content representing a plurality of watermark images;
    enabling a user to select a watermark image from the plurality of watermark images represented by the imaging service content;
    obtaining a reference to a watermark image selected by the user;
    identifying one or more compositions designated for integration with the reference to the selected watermark image, each of the one or more compositions including one or more graphic references and identifying an arrangement of one or more graphics referenced by the one or more graphic references in a document to be created;

for each of the one or more compositions, initiating the generation of a watermark composition comprising the reference to the watermark image and the one or more graphic references of that composition; and initiating the storage of the one or more generated watermark compositions in a personal imaging repository.

15. The computer-readable medium of claim 14, storing further instructions:

redirecting the one or more watermark compositions to at least one service to generate a product.

16. The computer-readable medium of claim 15, wherein the instructions for redirecting include instructions for redirecting a reference to at least one of the one or more watermark compositions, the watermark composition residing within the personal imaging repository.

* * * * *

UNITED STATES PATENT AND TRADEMARK OFFICE
CERTIFICATE OF CORRECTION

| | |
|---|---|
| PATENT NO. | : 7,295,677 B2 |
| APPLICATION NO. | : 10/087406 |
| DATED | : November 13, 2007 |
| INVENTOR(S) | : Shell Sterling Simpson et al. |

It is certified that error appears in the above-identified patent and that said Letters Patent is hereby corrected as shown below:

In column 20, line 51, in Claim 13, after "comprises" insert -- a --.

In column 21, line 11, in Claim 15, after "instructions" insert -- for --.

Signed and Sealed this

Twentieth Day of May, 2008

JON W. DUDAS
*Director of the United States Patent and Trademark Office*